United States Patent
Schiffmiller

(10) Patent No.: US 11,733,340 B1
(45) Date of Patent: Aug. 22, 2023

(54) SHORT BASELINE INTERFEROMETER (SBI) GEOLOCATION USING NELDER-MEAD

(71) Applicant: BAE Systems Information and Electronic Systems Integration Inc., Nashua, NH (US)

(72) Inventor: Richard Schiffmiller, Teaneck, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 634 days.

(21) Appl. No.: 16/793,395

(22) Filed: Feb. 18, 2020

Related U.S. Application Data

(60) Provisional application No. 62/810,154, filed on Feb. 25, 2019.

(51) Int. Cl.
| | |
|---|---|
| *G01S 5/02* | (2010.01) |
| *G01S 3/50* | (2006.01) |
| *G01S 5/06* | (2006.01) |
| G01S 3/48 | (2006.01) |
| G01S 3/56 | (2006.01) |
| G01S 5/04 | (2006.01) |

(52) U.S. Cl.
CPC ............. *G01S 5/0221* (2013.01); *G01S 3/50* (2013.01); *G01S 5/06* (2013.01); *G01S 3/48* (2013.01); *G01S 3/56* (2013.01); *G01S 5/04* (2013.01); *G01S 5/0278* (2013.01)

(58) Field of Classification Search
CPC ......... G01S 5/0221; G01S 5/0278; G01S 5/06; G01S 5/04; G01S 3/48; G01S 3/50; G01S 3/56
USPC ................................................. 342/417, 156
See application file for complete search history.

(56) References Cited

U.S. PATENT DOCUMENTS

| | | | | |
|---|---|---|---|---|
| 5,969,676 | A * | 10/1999 | Tran et al. ............... | G01S 3/46 342/13 |
| 5,990,833 | A * | 11/1999 | Ahlbom et al. ....... | G01S 5/0036 342/417 |
| 6,100,845 | A * | 8/2000 | Rose ....................... | G01S 5/04 342/417 |
| 6,411,249 | B1 | 6/2002 | Rose | |
| 6,577,272 | B1 * | 6/2003 | Madden .............. | G01S 5/0205 342/442 |
| 6,791,493 | B1 | 9/2004 | Rose | |
| 7,286,085 | B2 | 10/2007 | Kolanek et al. | |
| 7,315,280 | B2 * | 1/2008 | Schiffmiller et al. | G01S 5/0252 342/442 |
| 8,587,467 | B1 * | 11/2013 | Zemany ................ | G01S 11/02 342/107 |

(Continued)

*Primary Examiner* — Chuong P Nguyen
(74) *Attorney, Agent, or Firm* — Scott J. Asmus; Gary McFaline; Finch & Maloney PLLC

(57) ABSTRACT

Techniques are disclosed for determining a true bearing angle from an airborne platform to a source of a radar signal. In an embodiment, a grid is generated based on a coarse range to, and angle-of-arrival of, an electromagnetic signal. The grid represents a geographic area thought to contain the emission source. A measured spatial angle is computed for each pulse of the signal received during a data collection interval. Hypothesized spatial angles are computed for a point in each grid box in the grid. A score is generated for each grid point based on the computed hypothesized spatial angles for the grid point and the measured spatial angles. The grid point having the lowest score is identified as a seed location and is used to launch a Nelder-Mead algorithm that converges on a point in the grid. A true bearing angle to the source of a radar angle is computed to the point provided by the Nelder-Mead algorithm.

20 Claims, 9 Drawing Sheets

(56) References Cited

U.S. PATENT DOCUMENTS

| | | | | |
|---|---|---|---|---|
| 9,658,314 | B2* | 5/2017 | Parks et al. | G01S 3/46 |
| 10,345,428 | B1* | 7/2019 | Oden | G01S 5/0221 |
| 10,440,677 | B2* | 10/2019 | O'Shea et al. | G01S 5/0252 |
| 10,802,109 | B1* | 10/2020 | Schiffmiller | G01S 7/021 |
| 10,830,865 | B1* | 11/2020 | Schiffmiller | G01S 5/0249 |
| 10,884,095 | B2* | 1/2021 | Schiffmiller et al. | G01S 7/021 |
| 11,137,472 | B2* | 10/2021 | Schiffmiller | G01C 21/165 |
| 11,175,370 | B1* | 11/2021 | Schiffmiller et al. | G01S 3/42 |
| 2018/0203094 | A1* | 7/2018 | Gudim et al. | G01S 5/0249 |
| 2018/0267135 | A1* | 9/2018 | Pellegrini et al. | G01S 5/02695 |

* cited by examiner

Scan Schedule

| Dwell (Frequency) | Dwell Duration |
|---|---|
| Frequency A | 50 milliseconds |
| Frequency B | 50 milliseconds |
| Frequency C | 50 milliseconds |
| Frequency D | 50 milliseconds |
| . . . | . . . |
| Frequency N | 50 milliseconds |

FIG. 6

Geolocation Computation Time: T = 25 sec
Geolocation Computation Processing Interval: T = 5 sec
Data Collection Interval: T = 5 sec

SHORT BASELINE INTERFEROMETER (SBI) GEOLOCATION USING NELDER-MEAD

CROSS REFERENCE TO RELATED APPLICATIONS

This patent application claims the benefit of U.S. Prov. Ser. No. 62/810,154 filed Feb. 25, 2019.

FIELD OF THE DISCLOSURE

This disclosure relates generally to geolocating an emission source, and more particularly, to geolocating an emission source using the Nelder-Mead simplex algorithm.

BACKGROUND

In certain situations, it may be necessary to quickly and accurately determine a direction from which a received signal was transmitted. In cases where the signal is emitted by an emission source located on the surface of the Earth (e.g., on the ground or on the water), knowing this direction allows for determining the geographic location of the emission source. For example, electronics on an aircraft that is flying may alert the pilot to the detection of signals, such as electromagnetic pulses, transmitted by an emission source, such as a radar emitter or targeting system. In this example, knowing the direction or bearing angle to the emission source allows for determining the geographic location of that source, and allows the pilot to undertake or deploy any necessary countermeasures. However, there are a number of non-trivial issues associated with geolocating an emission source from signals received by an airborne aircraft.

BRIEF DESCRIPTION OF THE DRAWINGS

FIG. 6 illustrates an example scan schedule, in accordance with an embodiment of the present disclosure.

These and other features of the present embodiments will be understood better by reading the following detailed description, taken together with the figures herein described.

DETAILED DESCRIPTION

Figure 1:
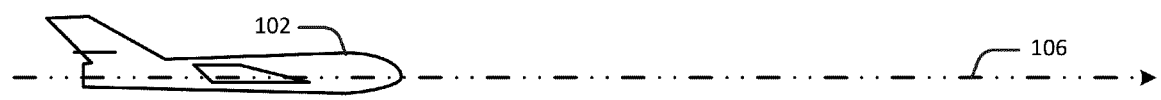
FIG. 1 illustrates a side elevation view of an example encounter between an aircraft and an emission source.
Figure 1:
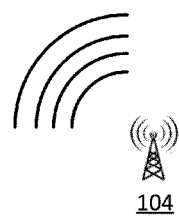
Figure 2:
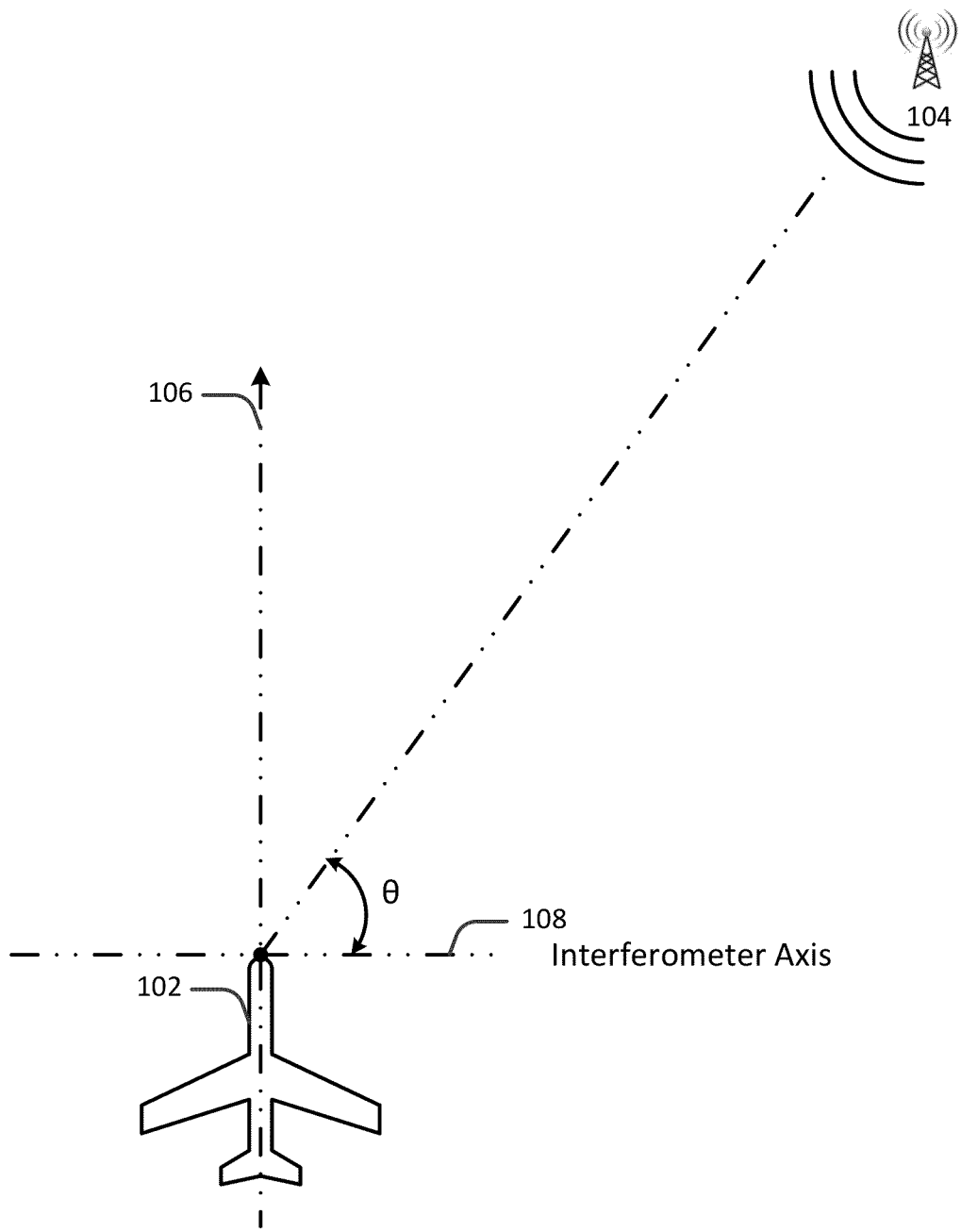
FIG. 2 illustrates an overhead view of the aircraft and the emission source of FIG. 1.

As mentioned above, it is often desirable for an aircraft in flight to quickly and accurately determine a direction from which a received or otherwise detected signal was transmitted. Accurate determination of an angle-of-arrival (AOA) of a detected signal allows the aircraft to geolocate the source of the detected signal. For instance, FIG. 1 illustrates a side elevation view of an example encounter between an aircraft 102 and an emission source 104. Emission source 104 may be an electromagnetic signal emitter, such as a radar emitter, that is located on the surface of the Earth. In the illustrated example, aircraft 102 is in flight and traveling at a heading 106 at a level altitude (e.g., flying substantially parallel to the Earth's surface). Emission source 104 is emitting signals, such as radar or electromagnetic signals, in an attempt to illuminate aircraft 102 in order to locate and/or track aircraft 102, in one such example scenario. FIG. 2 illustrates an overhead view of aircraft 102 and emission source 104 of FIG. 1. As can be seen, emission source 104 is located on the surface of the Earth at a geographical location that is in front and to the right of heading 106 of aircraft 102.

Aircraft 102 includes a detection system that periodically scans across the frequency band to detect electromagnetic signals, such as radar signals. The detection system can be active or activated during flight to detect radar signals emitted by emission source 104 and determine an AOA of the detected radar signals. Some such examples of the detection system include one or more short baseline interferometers (SBIs) that detect the radar signals and derive an AOA of the detected radar signals. In brief, an SBI includes multiple antennas arranged along an interferometer axis. For example, a two baseline SBI includes three antennas arranged collinearly along an interferometer axis. A three baseline SBI includes four antennas arranged collinearly along an interferometer axis. In general, an n baseline SBI include n+1 antennas arranged collinearly along an interferometer axis. An SBI measures the difference in phase (sometimes referred to herein more simply as phase difference) of a signal wavefront at the multiple antennas, and computes a spatial AOA of the detected signal as follows:

$$\cos(\theta) = (\Delta\varphi * \lambda)/(360 * D) \qquad [1]$$

where θ is the spatial angle between the interferometer axis of the SBI and a vector from the SBI to the signal emitter (e.g., the emission source), Δφ is the measured phase difference (in degrees) between the phases detected at the two antennas at respective ends of the longest baseline of the SBI, λ is the wavelength of the detected signal, and D is the length of the longest baseline of the SBI in the same units as the wavelength. The vertex of the spatial angle θ is at an antenna (one of the antennas) of the SBI at which the measurements are taken and is commonly referred to as a reference antenna. Note that the wavelength λ and the phase difference Δφ are measured, and the length D is known from the SBI design. Also note that the measured phase difference Δφ may be ambiguous in that Δφ can vary depending on the length D. In a resolved SBI (sometimes referred to herein more simply as SBI as context dictates), the placement of antennas is properly designed such that the ambiguity in Δφ is effectively eliminated.

As can be further seen in FIG. 2, the antennas of an SBI can be positioned at or proximate the nose of aircraft 102 in such a manner that the interferometer axis, as represented by a vector 108, lies perpendicular to heading 106. Moreover, vector 108 can lie in the same azimuth plane in which aircraft 102 lies. In the case of aircraft 102 being an airplane, the azimuth plane of aircraft 102 is the plane that passes through the airplane's fuselage from nose to tail and in which the airplane's wings lie. In any such cases, the SBI provides the spatial angle θ as shown in FIG. 2.

Figure 3:
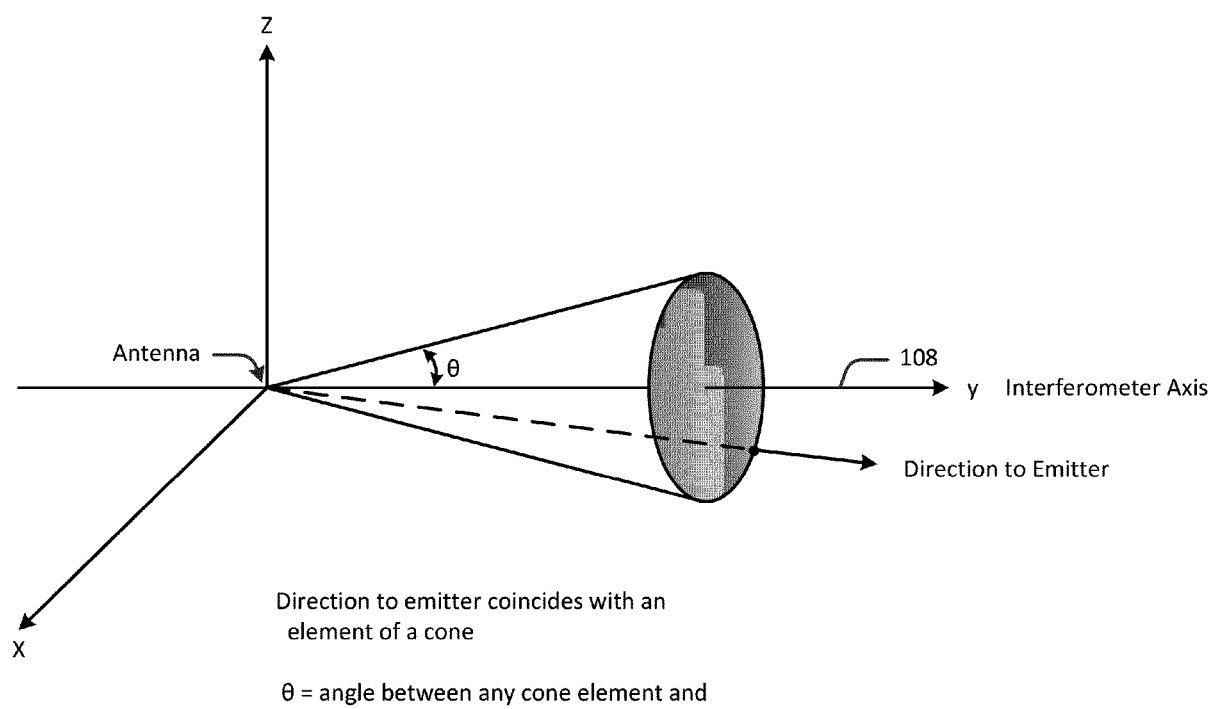
FIG. 3 illustrates an example representation of a cone angle θ provided by a resolved short baseline interferometer (SBI).

However, the spatial angle θ provided by the SBI is a cone angle and not an azimuth or so-called true bearing angle to emission source 104. FIG. 3 illustrates an example representation of such a cone angle θ. The apex of the cone is at the reference antenna of the SBI, and the axis of the cone is coincident with interferometer axis 108. A cone angle is the angle that the axis of the cone makes with any part of the cone. As can be seen, in the example case of a cone angle θ, the axis of the cone makes an angle of θ with any element of the cone. This is because emission source 104 need not be in the same azimuth plane as aircraft 102. For example, emission source 104 can lie in any azimuth plane that is above or below the azimuth plane of aircraft 102. Even constraining emission source 104 to be located on the surface of the Earth, emission signals from many different points on the surface of the Earth can produce the same cone angle θ. That is, emission source 104 can be located at many different points on the surface of the Earth and emit radar signals that produce the cone angle θ.

It is non-trivial to determine a true bearing angle of sufficient accuracy from the spatial angle provided by an SBI. One possible technique involves using a grid and minimizing a cost function over various points or locations in the grid. Here, a relatively dense grid is created around a rough estimate of the geographic location of the signal source. A starting point is then selected within the grid to launch a cost function. The cost function is then minimized by zooming in to a point in the grid that is a potentially more accurate location by changing the grid size, making the grid smaller and denser around that point. This process is repeated until a point in the grid is declared as the location of the emission source. However, if the seed or starting point selected to launch the cost function is not near the true or actual location of the signal source, the results of the cost function minimization may not be accurate. Another possible technique is a variation that involves using derivatives of the cost function, such as in the Gauss-Newton method, for example. Unfortunately, derivatives of the cost function are sensitive to variations and perturbations in the cost function caused by noise and measurement inaccuracies.

Thus, and in accordance with an embodiment of the present disclosure, techniques are disclosed for determining a true bearing (azimuth) angle from a spatial (e.g., cone) angle provided by an SBI. As will be appreciated in light of this disclosure, and according to some embodiments, these techniques are particularly well-suited for aircraft, such as airplanes, helicopters, drones, satellites, or other machines capable of flight, but are also applicable to other platforms capable of relatively fast movement. In an embodiment, an emission detection system for deployment onboard an aircraft can periodically scan across the frequency band to detect RF signals according to a scan schedule. In such embodiments, the scan schedule may specify a sequence of dwells and corresponding dwell durations. Each dwell is associated with a particular frequency and the corresponding dwell duration indicates the amount or length of time to be tuned to the particular frequency to detect any signals at that frequency.

According to such a scan schedule, the emission detection system can periodically dwell at the specified frequencies to detect signals. For a detected signal, the emission detection system can perform phase difference measurements for the received pulses of the detected signal. The pulses may be received by an SBI of the emission detection system. Note that, depending on the dwell duration, multiple pulses and, in some cases large numbers of pulses of the signal may be received by the SBI. In some such embodiments, the emission detection system measures the phase difference for each received pulse, and computes a spatial angle (also referred to herein as a measured spatial angle) using the measured phase difference.

Figure 4:
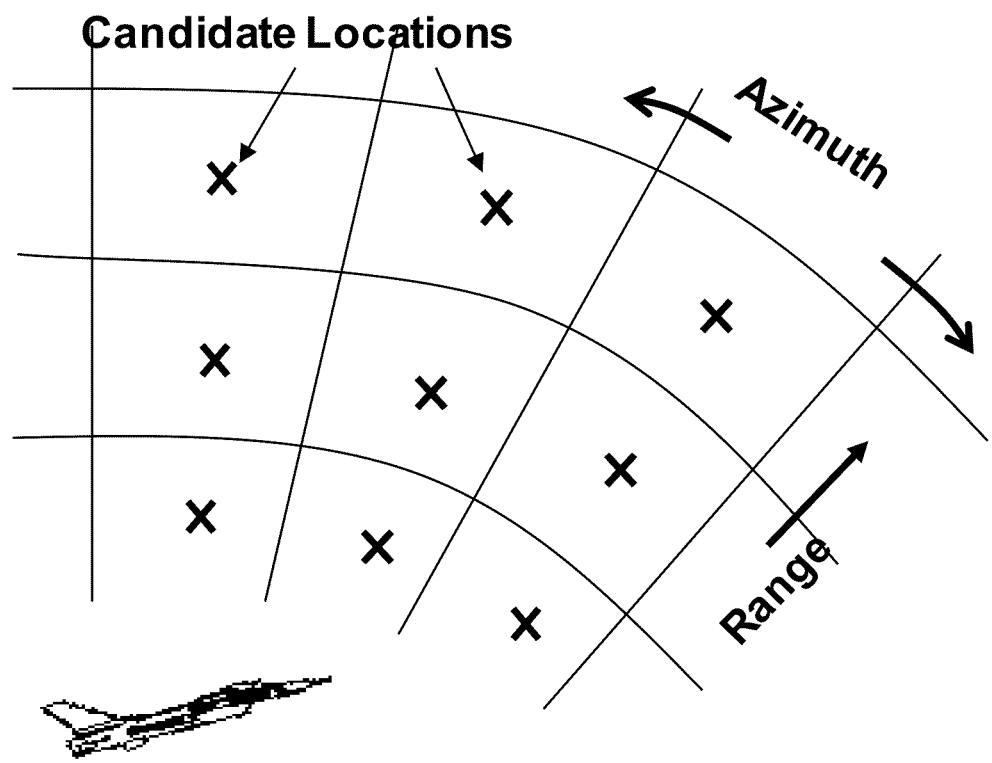
FIG. 4 illustrates an example grid that coarsely indicates the general area in which an emission source is likely located, in accordance with an embodiment of the present disclosure.

According to one embodiment, the emission detection system performs a geolocation computation to determine a geographic location of the emission source that is emitting a detected signal. In one such embodiment, the emission detection system postulates a grid on the surface of the Earth. This grid represents a coarse or rough estimate of where the emission source is located (i.e., the emission source is located somewhere in the grid). FIG. 4 illustrates an example grid that coarsely indicates the general area in which an emission source is likely located, in accordance with an embodiment of the present disclosure. The grid can be a 2-dimensional (2D) grid projected on the Earth surface and can be based on, for example, a crude measurement of the AOA of the detected signal and the range using the amplitude of the pulses. The grid serves to constrain the geographic location of the emission source. In some example cases, the grid can be about a quadrant in azimuth (e.g., ±45 degrees) from the nominal measure of the AOA, and have a spacing of about 1 degree (e.g., 0.9 degrees, 1.1 degrees). The grid can have a minimum range of about 2 nautical miles (nm) (e.g., 1.8 nm, 1.9 nm, 2.1 nm, 2.2 nm) and a maximum range of about 200 nm (e.g., 150 nm, 175 nm, 225 nm) from the aircraft or so-called ownship. The grid can also be sparse such that the spacing between the grid boxes (e.g., spacing between the candidate locations of respective the grid boxes) can be about 2 nm (e.g., 1.8 nm, 1.9 nm, 2.1 nm, 2.2 nm).

According to some such embodiments, the emission detection system can identify a point in each grid box as a candidate location of the emission source. In an example such embodiment, a point at or substantially at the center of the grid box (for example, as indicated by the "X" in each grid box as illustrated in FIG. 4) can be identified as a candidate location. In other embodiments, a point nearer the edge or border of the grid box can be identified as a candidate location. In a more general sense, any point in the grid box can be identified as a candidate location. The emission detection system can then compute a hypothesized spatial angle for each grid box by postulating the location of the emission source to be coincident with the identified point in each grid box. The computed hypothesized spatial angle is the spatial angle that would have been measured by the emission detection system had the emission source been actually located at that point in the grid box. Such a hypothesized spatial angle for each grid box is computed for each of the times when a measured spatial angle was computed.

To provide an illustrative example, suppose 150 pulses are received and a corresponding 150 measured spatial angles are computed. Also suppose that the grid includes 100 grid boxes. In this example, 150 hypothesized spatial angles, each hypothesized spatial angle corresponding to a respective one of the 150 measured spatial angles, are computed for each of the 100 grid boxes. Note that the time-of-arrival (TOA) of the pulse that resulted in the measured spatial angle (that caused the computation of the measured spatial angle) can be assumed to be the time when the measured spatial angle was computed. It will be further appreciated that a hypothesized spatial angle for a grid box can be computed for the time when a measured spatial angle was computed since the position and orientation of the emission detection system at the time of receiving the pulse and measuring the phase difference used to compute the measured spatial angle are known.

According to one such example embodiment, the emission detection system generates a score for each grid box based on the cosines of the hypothesized spatial angles (sometimes referred to herein more simply as hypothesized cosines or hypothesized cosine in the singular) computed for a grid box and the cosines of the measured spatial angles (sometimes referred to herein more simply as measured cosines or measured cosine in the singular). In an example embodiment, the score for a grid box is the sum of the squares of the differences between the measured and hypothesized cosines computed for the grid box. In other embodiments, the score for a grid box is the sum of the squares of the differences between the measured and hypothesized cosines computed for the grid box, divided by the number of measurements computed for the grid box. For instance, in such embodiments, the number of measurements computed for the grid boxes may vary between the grid boxes. In such cases, dividing by the number of measurements normalizes the scores generated for the grid boxes. Note that the differences are between the measured and hypothesized cosines for the same compute times.

To provide an illustrative example, suppose a first measured cosine corresponding to a first measured spatial angle computed at time T=1, a second measured cosine corresponding to a second measured spatial angle computed at time T=2, a first hypothesized cosine corresponding to a first hypothesized spatial angle computed for time T=1, and a second hypothesized cosine corresponding to a second hypothesized spatial angle computed for time T=2. In this example, the score is the sum of the square of the difference between the first measured cosine and the first hypothesized cosine, and the square of the difference between the second measured cosine and the second hypothesized cosine. In other embodiments, the score for a grid box is the sum of the absolute values of the differences between the hypothesized cosines computed for the grid box and the measured cosines. In any case, the emission detection system generates a score for each grid box, wherein the score is a measure of closeness of the hypothesized spatial angles for each grid box and the measured spatial angles. It will be appreciated that, in other embodiments, the score for each grid box can be based on the hypothesized spatial angles computed for a grid box and the measured spatial angles.

The emission detection system then identifies the grid box with the lowest score as a seed location and launches a Nelder-Mead algorithm from the seed location. In brief, the Nelder-Mead algorithm begins with a seed location and computes a cost function. The Nelder-Mead algorithm attempts to reduce the value of the cost function by manipulating a simplex hyper-polygon to converge on a location in the grid. A hyper-polygon is a polygon in multiple dimensions. Each time the Nelder-Mead algorithm iterates this procedure (e.g., manipulates the simplex), the Nelder-Mead algorithm recalculates the cost function for the new locations represented by the vertices of the hyper-polygon. The Nelder-Mead algorithm exits when the value of the cost function is less than some specified threshold value. The Nelder-Mead algorithm can also exit as a failure if it exceeds some specified maximum number of iterations without getting the value of the cost function below the specified threshold value. The Nelder-Mead algorithm is further variously described below in conjunction with FIGS. 5 through 10. In an example embodiment, the true bearing angle is computed to the location determined by the Nelder-Mead algorithm from the final position and orientation of the SBI at the end of the data collection interval. The data collection interval is further described below in conjunction with FIG. 9.

Note that multiple dwell durations may occur before a geolocation computation is performed to determine a geographic location of the emission source. In such cases, the measured spatial angles collected during the multiple dwell durations are used to generate the scores for each grid box. To provide an illustrative example, suppose there are three dwell durations, and 25, 30, and 30 measured spatial angles collected during the three dwell durations, respectively. This results in 85 (i.e., 25 + 30 + 30) hypothesized spatial angles being computed for each grid box. In this example, the cosines of the 85 measured spatial angles collected during the three dwell durations and the cosines of the 85 hypothesized spatial angles computed for each grid box are used to generate the scores for each of the grid boxes. In an embodiment, the cosines of the 85 measured spatial angles collected during the multiple dwell durations can be provided to the Nelder-Mead algorithm for use in calculating the scores (e.g., compute the cost function).

Also note that multiple geolocation computations may be performed to determine a geographic location of the emission source. In such cases, each geolocation computation is performed using all the data collected during the multiple dwell durations that occurred since the start of the geolocation processing. To provide an illustrative example, starting from a time T=0, suppose the geolocation computation is to be performed two times, for example, at a time T=1 and at a time T=2, to determine a geographic location of the emission source. Also suppose that 150 measured spatial angles are computed during the time from T=0 to T=1. This results in 150 hypothesized spatial angles being computed for each grid box. At time T=1, the 150 measured spatial angles and the 150 hypothesized spatial angles computed for each grid box are used to generate a score for each of the grid boxes. Continuing the above example, suppose that an additional 130 measured spatial angles are computed during the time from T=1 to T=2. This results in an additional 130 hypothesized spatial angles being computed for each grid box. At time T=2, the 280 measured spatial angles (e.g., the 280 measured spatial angles computed during the time T=0 to T=2) and the 280 hypothesized spatial angles for each grid box (e.g., the 280 hypothesized spatial angles computed for each grid box from the time T=0 to T=2) are used to generate a score for each of the grid boxes. In a general sense, the score for each box is computed using the measured spatial angles collected over all time (e.g., from time T=0). This results in each iteration of the geolocation computation being performed using data collected over all time.

The disclosed techniques provide numerous advantages over previous techniques for determining a true bearing angle from a spatial angle, such as a spatial angle provided by an SBI. For example, and according to an embodiment, the techniques employ a Nelder-Mead algorithm that does not use derivatives of a cost function. Thus, unlike certain minimization approaches of previous techniques, the Nelder-Mead algorithm operates on the cost functions in ways that are not or are effectively less sensitive to variations and perturbations due to noise and measurement inaccuracies. Also, as will be further appreciated in light of this disclosure, the Nelder-Mead algorithm can be used to converge on a location that yields a relatively accurate true bearing angle even if the Nelder-Mead algorithm is launched using a seed location that is many miles from the true or actual geographic location of the emission source. For instance, simulations of some example embodiments have shown the true bearing angle determination to better than one (1) degree accuracy. These and other advantages and alternative embodiments will be apparent in light of this disclosure.

System Architecture

Figure 5:
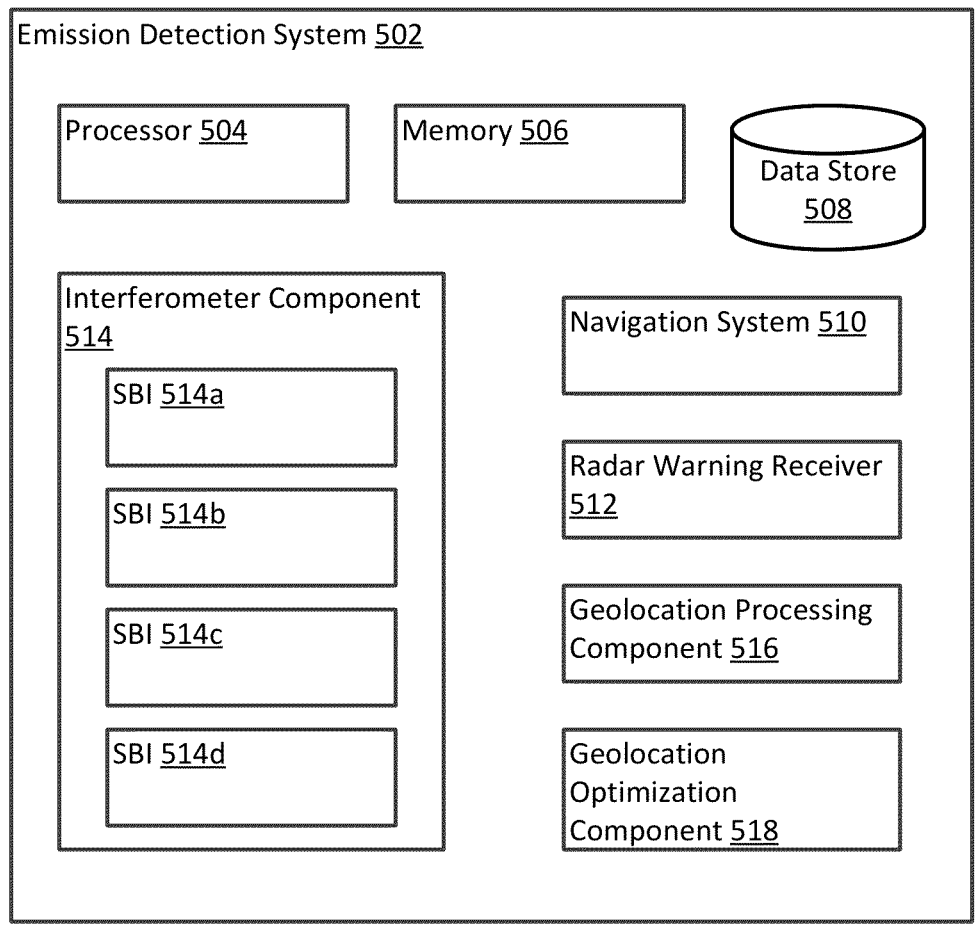
FIG. 5 is a block diagram illustrating selected components of an example emission detection system, in accordance with an embodiment of the present disclosure.

FIG. 5 is a block diagram illustrating selected components of an example emission detection system 502, in accordance with an embodiment of the present disclosure. Emission detection system 502 can be employed, for example, in an aerial platform such as aircraft 102, although any number of other applications where there is a need for determining a true bearing angle of a detected signal will be apparent. As shown, detection system 502 includes a processor 504, a memory 506, a data store 508, a navigation system 510, a radar warning receiver 512, an interferometer component 514, a geolocation processing component 516, and an optimization component 518. Processor 504, memory 506, data store 508, navigation system 510, radar warning receiver 512, interferometer component 514, geolocation processing component 516, and optimization component 518 may be communicatively coupled to one or more of the other. In various embodiments, additional components (not illustrated, such as interface circuitry, input/output interface, etc.) or a subset of the illustrated components can be employed without deviating from the scope of the present disclosure. For instance, in various embodiments, emission detection system 502 may not include one or more of the components illustrated in FIG. 5, but emission detection system 502 may connect or otherwise couple to the one or more components via interface circuitry. Other embodiments may integrate the various functionalities of the illustrated components into fewer components or more components. For example, some or all of the functionality and/or components of radar warning receiver 512 may be integrated into and/or performed by interferometer component 514. In a more general sense, the degree of integration and distribution of the functional component(s) provided herein can vary greatly from one embodiment to the next, and this disclosure should not be construed as limited in this regard.

Processor 504 may be designed to control the operations of the various other components of emission detection system 502. Processor 504 may include any processing unit suitable for use in emission detection system 502, such as a single core or multi-core processor. In general, processor 504 may include any suitable special-purpose or general-purpose computer, computing entity, or computing or processing device including various computer hardware, or firmware, and may be configured to execute instructions, such as program instructions, stored on any applicable computer-readable storage media. For example, processor 504 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 5, processor 504 may include any number of processors and/or processor cores configured to, individually or collectively, perform or direct performance of any number of operations described in the present disclosure.

Memory 506 may include computer-readable storage media configured for carrying or having computer-executable instructions or data structures stored thereon. Such computer-readable storage media may include any available media that may be accessed by a general-purpose or special-purpose computer, such as processor 504. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Data store 508 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), NVM, or any other storage medium, including those provided above in conjunction with memory 506, which may be used to carry or store particular program code in the form of computer-executable instructions or data structures and which may be accessed by a general-purpose or special-purpose computer. Combinations of the above may also be included within the scope of computer-readable storage media.

Navigation system 510 is generally configured to provide platform positions and orientation data. In an embodiment, navigation system 510 is implemented using an inertial navigation system (INS), and includes components, such as processors, motion sensors, and/or rotation sensors, to compute the position, the orientation, and the velocity of aircraft 102. The position and orientation of emission detection system 502 can be computed from the platform's position and orientation data since the position and orientation of emission detection system 502 relative to aircraft 102 is known. In operation, navigation system 510 can determine the platform's position (e.g., the latitude, longitude, and altitude of aircraft 102) and the platform's orientation (e.g., roll, pitch, and yaw or so-called heading) at discrete, periodic intervals, such as once every 40 milliseconds (ms), 45 ms, 50 ms, 55 ms, etc. In such embodiments, navigation system 510 can determine the time at which a discrete position and orientation data determination was made and store the position and orientation data and time pair in data store 508.

Radar warning receiver 512 is generally configured to detect signals and provide coarse measurements of an AOA of the detected signal and the range to the detected signal. This AOA and range provide a coarse or otherwise crude indication of the general area where the emitter is located. Radar warning receiver 512 includes multiple antennas (not shown) that are used to receive radar signals. The antennas can be placed around aircraft 102 to provide the desired coverage. In operation, radar warning receiver 512 provides the crude measurements by periodically scanning across the frequency band and determining various parameters of the received signals, such as frequency, signal shape, direction of arrival, etc. As will be further described below, the crude measure of the AOA can be used by geolocation processing component 516 to generate a grid that serves as a constraint on the geographical location of the emission source.

Interferometer component 514 is generally configured to detect signals and measure or otherwise collect data regarding the detected signals. In an embodiment, interferometer component 514 detects the signals using one or more SBIs. Depending on the design characteristics, an SBI may have a limited field of regard, such as a field of regard of approximately ± 70 degrees. Thus, depending on the desired coverage of the directions around aircraft 102, interferometer component 514 can utilize one or more SBIs. As shown in FIG. 5, interferometer component includes four SBIs 514a-514d. The number of SBIs depicted in interferometer component 514 is for illustration, and one skilled in the art will appreciate that interferometer component 514 can include a different number of SBIs. In a general sense, the number of SBIs can vary depending on factors such as the field of regard of each SBI, the size of aircraft 102, the shape of aircraft 102, and the desired coverage of the directions around aircraft 102, to name a few examples, and the present disclosure should not be understood as being limited in this regard.

Each of SBIs 514a-514d can be positioned about aircraft 102 such that the antennas of SBIs 514a-514d are placed to provide the desired coverage of the directions around aircraft 102. In operation, interferometer component 514 can periodically scan across the frequency band to detect signals according to a scan schedule. FIG. 6 illustrates an example scan schedule, in accordance with an embodiment of the present disclosure. As can be seen, the scan schedule specifies a sequence of dwells and corresponding dwell durations. According to the illustrated scan schedule, interferometer component 514 is to tune to the specified frequencies (e.g., Frequency A, Frequency B, Frequency C, Frequency D, ..., Frequency N) for a duration of 50 milliseconds at each specified frequency. For example, interferometer component 514 tunes to Frequency A for 50 milliseconds, then tunes to Frequency B for 50 milliseconds, and so forth until interferometer component 514 tunes to Frequency N for 50 milliseconds. After tuning to Frequency N for 50 milliseconds (e.g., the last dwell in the sequence), interferometer component 514 can repeat the specified sequence of dwells. Note that the dwell durations need not be the same for each specified frequency. For example, one or more of the specified frequencies can be associated with a dwell duration that is different than the dwell duration associated with at least one other specified frequency.

For a detected signal, interferometer component 514 identifies the SBI (e.g., one of SBIs 514a-514d) that receives the strongest signal and measures a phase difference for each pulse of the signal received at the identified SBI. As previously explained, the phase difference is measured between a reference antenna of the identified SBI and each of the other antennas of the SBI. Each phase measurement is the residue of the number of cycles of the wave passing between the antennas (e.g., the angle beyond an integral number of 360° cycles). The multiple phase measurements in a properly designed SBI resolve the number of 360° cycles ambiguity (i.e., the number of cycles of the wave passing between the antennas) inherent in interferometers, and allow for unambiguous determination of the spatial angle to the emission source. Note that multiple pulses of the signal may be received during the dwell duration, and interferometer component 514 measures a phase difference for each received pulse. Interferometer component 514 computes a measured spatial angle for each measured phase difference. As previously explained, the measured spatial angle defines the angle between the interferometer axis of the identified SBI and a vector from the identified SBI to the signal emission source. As such, interferometer component 514 needs to know the position and orientation of the identified SBI at the time of each phase difference measurement. In an example embodiment, interferometer component 514 can assume that the time of each phase difference measurement is the TOA of each pulse, for example, at the identified SBI. Note that pulses typically arrive anywhere from 10 microseconds or so to a few milliseconds apart from each other. This pulse repetition interval (PRI) may or may not be constant. Also note that the navigation data (e.g., platform position and orientation data provided by navigation system 512), from which interferometer component 514 can compute the identified SBI's position and orientation, may be available at times asynchronous to the pulse arrival times. For instance, navigation system 512 may be able to provide the platform position and orientation data every 50 milliseconds or so. It will be appreciated that the identified SBI's position and orientation may be derived from the navigation data since the location and positioning of the identified SBI on aircraft 102 is known. In some such embodiments, interferometer component 514 can determine the position and orientation of the identified SBI at the time of each phase difference measurement by linearly interpolating between a first platform position and orientation data before the phase difference measurement of interest and a second platform position and orientation data after the phase difference measurement of interest. To provide an illustrative example, suppose the platform position and orientation data is provided at times T=2, T=5, T=8, and T=11, and the phase difference measurement is made at time T=7. In this example, interferometer component 514 can determine the position and orientation of the identified SBI at time T=7 (i.e., at the time of the phase difference measurement of interest) by linearly interpolating between the platform position and orientation data at time T=5 and the platform position and orientation data at time T=8. In other embodiments, interferometer component 514 can determine the position and orientation of the identified SBI at the time of each phase difference measurement by linearly extrapolating a platform position and orientation data provided at a time before the phase difference measurement of interest. The linear extrapolation of the platform position and orientation data can be based on the rate of change in position (e.g., velocity for each of the three spatial directions) and the rate of change in orientation (e.g., roll rate, pitch rate, and yaw rate). In any such cases, interferometer component 514 can store the measured phase difference, the measured spatial angle, the position and orientation of the SBI, and the TOA of the pulse, for each received pulse, in data store 508.

Geolocation processing component 516 is generally configured to determine a true bearing angle of a detected signal from a spatial angle provided by an SBI, such as one of the SBIs of interferometer processing component 514. In an embodiment, geolocation processing component 516 uses the data provided by the various other components of emission detection system 502 to determine a geographic location of the emission source, and determine the true bearing angle based on the geographic location of the emission source. In such embodiments, the geographic location of the emission source can be determined using the Nelder-Mead algorithm. In brief, geolocation processing component 516 first postulates a projection of a grid on the surface of the Earth based on a crude indication of a geographic location of the emission source. Geolocation processing component 516 generates a score for each grid box in the grid and forms a cost function based on the generated scores of the grid boxes. Geolocation processing component 516 then identifies a point in the grid as a seed location and launches the Nelder-Mead algorithm from the seed location.

Figure 7:
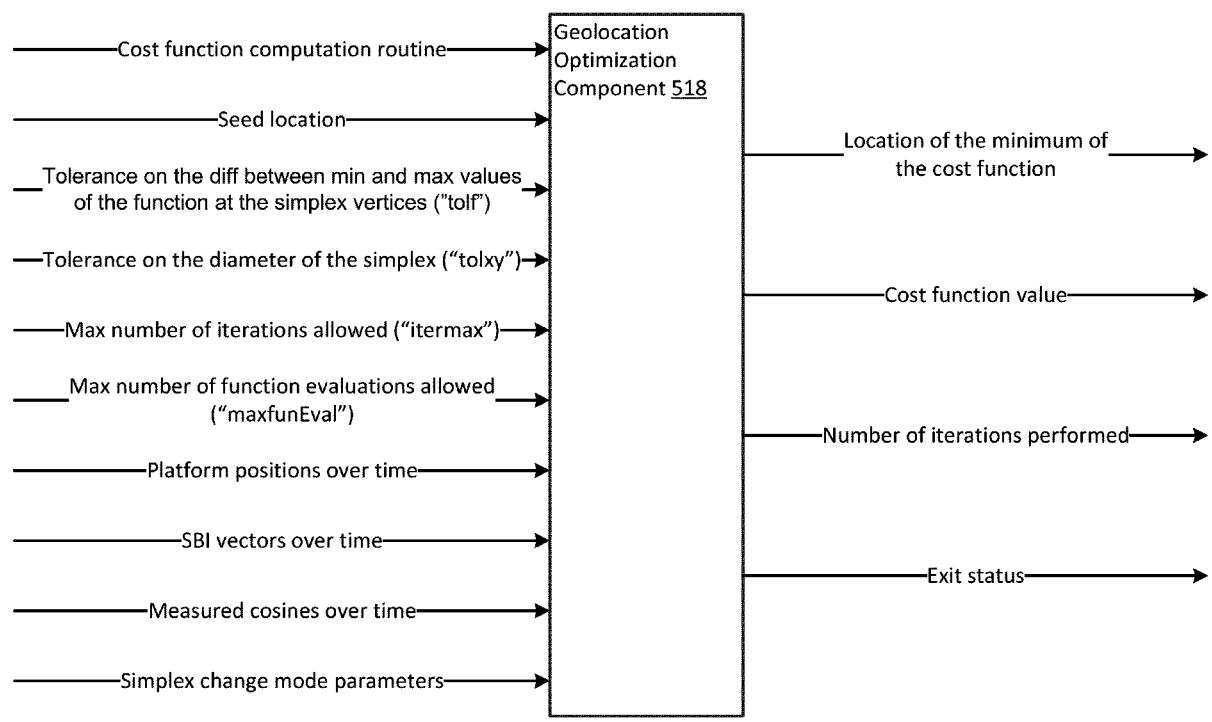
FIG. 7 is a diagram illustrating example inputs to and outputs of a geolocation optimization component of the emission detection system of FIG. 5, in accordance with an embodiment of the present disclosure.

Geolocation optimization component 518 represents an implementation of the Nelder-Mead algorithm. FIG. 7 is a diagram illustrating example inputs and outputs of geolocation optimization component 508, in accordance with an embodiment of the present disclosure. As shown in FIG. 7, geolocation optimization component 508 receives or otherwise is provided the following inputs:

Cost function computation routine;
Seed location;
Tolerance on the difference between minimum and maximum values of the function at the simplex vertices ("tolf");
Tolerance on the diameter of the simplex ("tolxy");
Maximum number of iterations allowed ("itermax");
Maximum number of function evaluations allowed ("maxfunEval");
Platform positions over time;
Interferometer vectors over time;
Measured cosines over time; and
Simplex change mode parameters.

The cost function computation routine is the code to compute the cost function. The seed location is the initial guess of the location of the minimum of the cost function. In some example cases, the seed location may be a point in the grid box with the lowest score. The parameter "tolf" defines the allowable tolerance on the difference between minimum and maximum values of the cost function at the simplex vertices. In some example cases, the value of "tolf" can be set to a suitable value, such as 0.0001. 0.00015. 0.0002, or any other suitable value. The parameter "tolxy" defines the allowable tolerance on the diameter of the simplex, and can be set to a suitable value, such as 0.75. 0.80. 0.85, or any other suitable value. The parameter "itermax" defines the maximum number of allowed iterations of the process, and can be set to a suitable value, such as 900, 1,000, 1,100, or any other suitable value. The parameter "maxfunEval" defines the maximum number of allowed cost function evaluations, and can be set to a suitable value, such as 900, 1,000, 1,100, or any other suitable value. As will be appreciated in light of this disclosure, the values of the aforementioned parameters can vary greatly, and the claimed invention is not intended to be limited to any particular value or values.

The platform positions over time include the platform position information, such as the position and orientation of aircraft 102, over the time the pulses were received. An SBI vector is a vector whose length is the length of the SBI (e.g., the length from the antenna at one end of the SBI to the antenna at the other end of the SBI) and whose direction is the orientation of the SBI in platform (e.g., aircraft 102) body coordinates. As the platform moves, the position and orientation of the platform move and change in space, which causes the orientation of the SBI vector in space coordinates (e.g., earth-centered, earth fixed (ECEF) coordinates) to change. The SBI vectors over time include the SBI vectors computed for each of the TOAs of the received pulses. The measured cosines over time include the cosines of the measured spatial angles computed for each of the received pulses. The provided platform positions over time, interferometer vectors over time, and measured cosines over time can be used by geolocation optimization component 518 in calculating the scores (e.g., compute the cost function) at each vertex of the simplex hyper-polygon.

The simplex change mode parameters are the parameters used to control the degree of distortion applied to the vertices of the simplex hyper-polygon for the different change modes. In some example cases, the parameters include "usual_delta", "zero_term_delta", "rho", "chi", "rhochi", "psi", "psirho", and "sigma". The parameter "usual_delta" defines the fraction of the non-zero coordinate value used to "nudge" (e.g., slightly move) the coordinate for the next cost function evaluation, and can be set to a suitable value, such as 0.04, 0.05, 0.06, or any other suitable value. The parameter "zero_term_delta" defines the value used to "nudge" a zero coordinate value for the next cost function evaluation, and can be set to a suitable value, such as 0.00020, 0.00025, 0.00030, or any other suitable value. The parameter "rho" defines the degree of distortion applied to the vertices in the reflect change mode, and can be set to a suitable value, such as 0.9, 1.0, 1.1, or any other suitable value. The parameter "chi" is used to compute a value for the parameter "rhochi" and can be set to a suitable value such as 1.9, 2.0, 2.1, or any other suitable value. The parameter "rhochi" (rho*chi) defines the degree of distortion applied to the vertices in the expand change mode. The parameter "psi" defines the degree of distortion applied to the vertices in the contract inside change mode, and can be set to a suitable value, such as 0.4, 0.5, 0.6, or any other suitable value. The parameter "psirho" (psi*rho) defines the degree of distortion applied to the vertices in the contract outside change mode. The parameter "sigma" defines the degree of distortion applied to the vertices in the shrink change mode, and can be set to a suitable value, such as 0.4, 0.5, 0.6, or any other suitable value. As will be appreciated in light of this disclosure, the values of the aforementioned simplex change mode parameters can vary greatly, and the claimed invention is not intended to be limited to any particular value or values.

As shown in FIG. 7, geolocation optimization component 508 outputs or otherwise provides a location of the minimum of the cost function, a cost function value, a number of iterations performed, and an exit status. The location of the minimum of the cost function is the minimum cost location and is specified in the coordinate system used by the inputs to geolocation optimization component 508. The cost function value is the minimum cost function value achieved by geolocation optimization component 508. The number of iterations performed is the number of iterations of the simplex shape changes performed to arrive at the minimum cost location. The exit status is a value, such as a binary value, that indicates whether the Nelder-Mead algorithm exited with a valid answer within the allowed number of iterations (e.g., exit status = 1) or whether the Nelder-Mead algorithm could not find a solution/answer (e.g., exit status = 0).

In operation, geolocation optimization component 508 starts with the provided seed location and computes the cost function as specified by the cost function computation routine. Geolocation optimization component 508 tries to reduce the value of the cost function by its manipulation of a simplex hyper-polygon. The number of vertices in the simplex is one more than the dimension of the region over which the search for the minimum of the cost function is performed. For example, for a 2-dimensional search, the simplex includes three vertices. Each vertex of the simplex has a cost function value associated with it. Geolocation optimization component 508 performs a series of changes to the shape of the simplex and, after each change, recalculates the costs at the vertices. Geolocation optimization component 508 repeats this process until the diameter of the simplex is less than the specified allowable tolerance on the diameter of the simplex (the value specified for the "tolxy" parameter) AND the cost function values at the vertices differ from the minimum cost function value of the simplex by less than the specified allowable tolerance on the difference between minimum and maximum values of the cost function at the simplex vertices (the value specified for the "tolf" parameter). The changes to the simplex that are undertaken include "expand," "shrink," "reflect," "contract outside," and "contract inside" change modes. Geolocation optimization component 508 can determine the change mode to use at each step based on the cost values at the vertices of the simplex. Geolocation optimization component 508 can control the degree of distortion applied to the vertices for the different change modes according to the values specified for the simplex change mode parameters "rho", "chi", "rhochi", "psi", "psirho", and "sigma". Geolocation optimization component 508 can exit as an error or failure condition (exit status = 1) upon exceeding a threshold number of iterations (the value specified for the "itermax" parameter) without getting the cost function value below its specified threshold value and the simplex diameter below its specified threshold value. Note that this converged location is a point in the grid having the lowest cost over all the grid boxes and over all time. Geolocation processing component 516 may compute a true bearing angle to the geographic location of the emission source as determined by the Nelder-Mead algorithm from a final position and orientation of the SBI at the end of the data collection interval. As will be appreciated in light of this disclosure, the true bearing angle to the emission source is a true bearing angle of the detected signal emitted by the emission source.

In some embodiments, geolocation processing component 516 can perform multiple geolocation computations. That is, geolocation processing component 516 can launch the Nelder-Mead algorithm (geolocation optimization component 518) multiple times to determine a geographic location of the emission source, and compute the true bearing angle of the emission source after each execution of the Nelder-Mead algorithm. For instance, assuming a current time T=0, geolocation processing component 516 can launch the Nelder-Mead algorithm multiple times, such as at a time T=4 seconds, at a time T=8 seconds, and at a time T=12 seconds, to determine the geographic location of the emission source. In such example embodiments, at each launch of the Nelder-Mead algorithm, the Nelder-Mead algorithm receives or is otherwise provided the measured data (e.g., the data measured by the SBI for all the received pulses) for all time from T=0, and the positions and orientations of the SBI at all pulse times from T=0. Thus, in such embodiments, the Nelder-Mead algorithm processes all the data over all time from time T=0 to determine the geographic location. Geolocation processing component 516 will be further described below with respect to FIGS. 8-10.

Methodology

Figure 8:
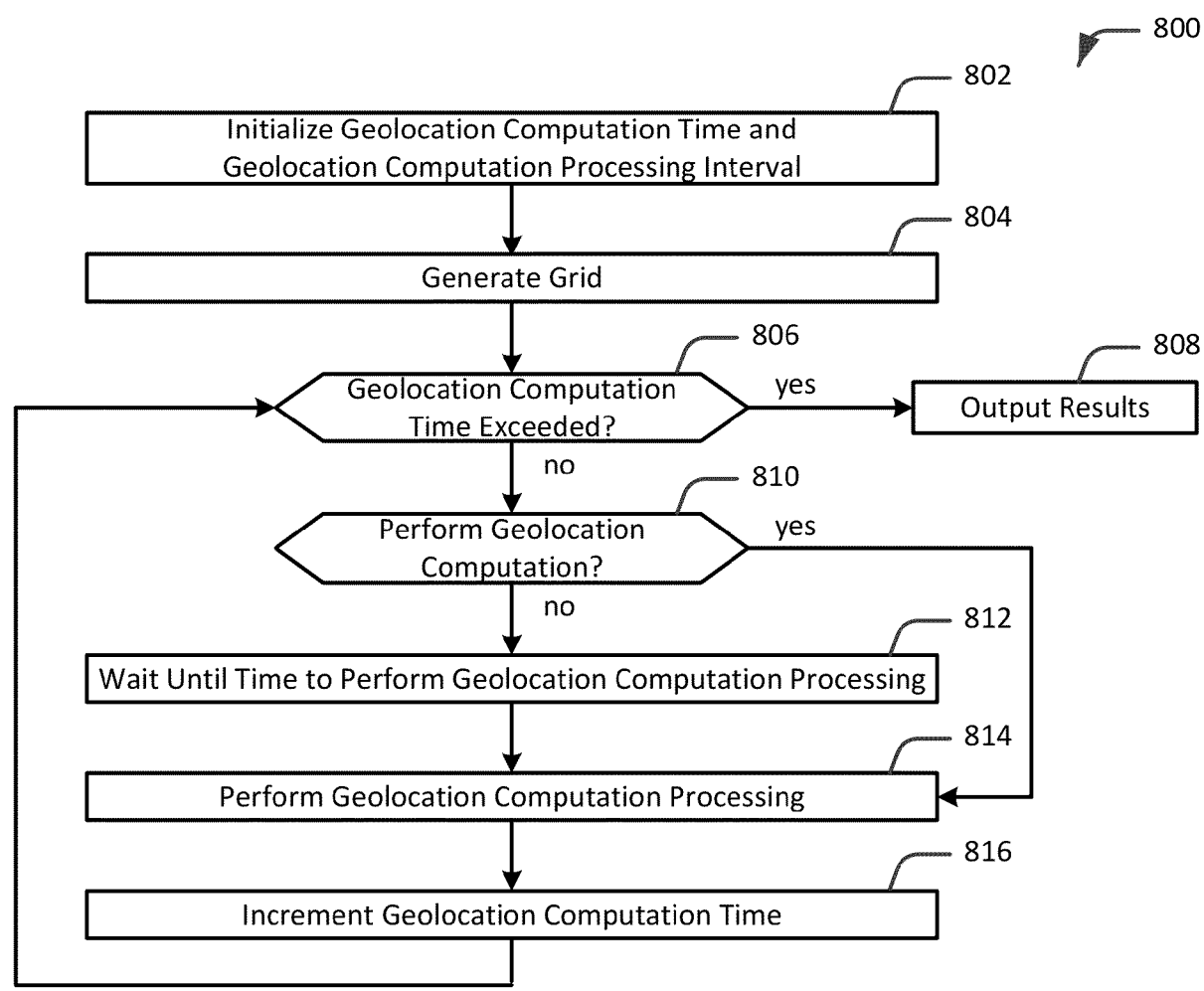
FIG. 8 is a flow diagram illustrating an example process for performing multiple geolocation computations within the confines of a grid in which a target emission source is likely located, in accordance with an embodiment of the present disclosure.

FIG. 8 is a flow diagram illustrating an example process 800 for performing multiple geolocation computations within the confines of a grid in which a target emission source is likely located, in accordance with an embodiment of the present disclosure. Process 800 may be performed by emission detection system 502 onboard an aerial platform, such as aircraft 102, upon detecting a signal. In such cases, process 800 may be performed to determine a geographic location of an emission source using multiple geolocation computations. The operations, functions, or actions described in the respective blocks of example processes 800 and an example process 1000, which will be further described below, may be stored as computer-executable instructions in a computer-readable medium, such as memory 506 and/or data store 508 of emission detection system 502.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments. To this end, each of the example processes depicted is provided to give one example embodiment and is not intended to limit the process to any particular physical or structural configuration.

With reference to example process 800 of FIG. 8, at 802, geolocation processing component 516 initializes a geolocation computation time and a geolocation computation interval. The geolocation computation time defines a period of time for collecting the data with which to perform the geolocation computations to determine the geographic location of the emission source that is emitting the detected signal. The geolocation computation processing interval defines the time interval for performing the geolocation computation. It will be appreciated in light of this disclosure that a sufficient amount of data is necessary to generate a good result (i.e., an accurate indication of the geographic location of the emission source). However, waiting too long to collect the data may compromise (e.g., jeopardize) or otherwise expose aircraft 102 to potential harm. In order to address these issues, the geolocation computation can be performed at discrete times (as defined by the geolocation computation processing interval) during the collection of the data or so-called data collection interval (as defined by the geolocation computation time). This allows for providing periodic indications of the geographic location of the emission source during the data collection. Note that performing the geolocation processing too frequently may result in a waste of computing resources without providing improved results.

Figure 9:
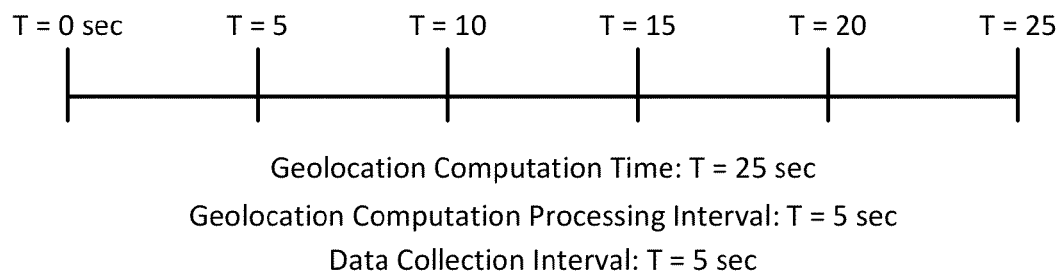
FIG. 9 is a diagram depicting an example geolocation computation time and geolocation computation processing interval, in accordance with an embodiment of the present disclosure.

FIG. 9 is a diagram depicting an example geolocation computation time and geolocation computation processing interval, in accordance with an embodiment of the present disclosure. As shown, the geolocation processing time is initialized to 25 seconds, and the geolocation computation processing interval is initialized to 5 second data collection intervals. Based on these initialized times, geolocation processing component 516 performs the geolocation computation at five second data collection intervals (e.g., at T=5 seconds, at T=10 seconds, at T=15 seconds, at T=20 seconds, and at T=25 seconds) during the 25 second geolocation processing time period. Note that, as previously explained, interferometer component 514 may collect the data regarding the detected signal based on a scan schedule, for instance. Based on the scan schedule, interferometer component 514 can collect the data over one or more dwell durations that occur within a data collection interval. For instance, a discrete number of dwell durations, such as two, three, four, etc., can occur between times T=0 and T=5, times T=5 and T=10, times T=10 and T=15, times T=15 and T=20, and times T=20 and T=25. Geolocation processing component 516 can use this data, as well as data collected by other components of emission detection system 502, to perform the geolocation computations.

Referring again to process 800 of FIG. 8, at 804, geolocation processing component 516 generates a grid based on a crude measurement of the range to, and AOA of, the detected signal. The crude measures of the range and AOA may be provided by radar warning receiver 512. The grid covers an area on the surface of the Earth that serves as a constraint on the geographic location of the emission source. By generating such a grid, geolocation processing component 516 is postulating that the emission source is located somewhere inside the grid. Note that the grid does not change (e.g., remains constant) during the multiple geolocation computations.

At 806, geolocation processing component 516 checks to determine whether the geolocation computation time is exceeded. Here, geolocation processing component 516 is checking to determine whether the number of geolocation computations, as specified by the the geolocation processing time period and the geolocation computation processing interval, have been performed. If the geolocation computation time has been exceeded (e.g., the specified number of geolocation computations have been performed), then, at 808, geolocation processing component 516 outputs the results of the geolocation computation processing. In some embodiments, geolocation processing component 516 can graphically indicate the geographic location of the emission source on a display viewable by the pilot and/or crew of aircraft 102. In some such embodiments, geolocation processing component 516 can also provide a graphical and/or text indication of the true bearing angle of the detected signal. In other embodiments, geolocation processing component 516 may also provide an audible indication of the geographic location of the emission source and/or the true bearing angle of the detected signal.

Figure 10:
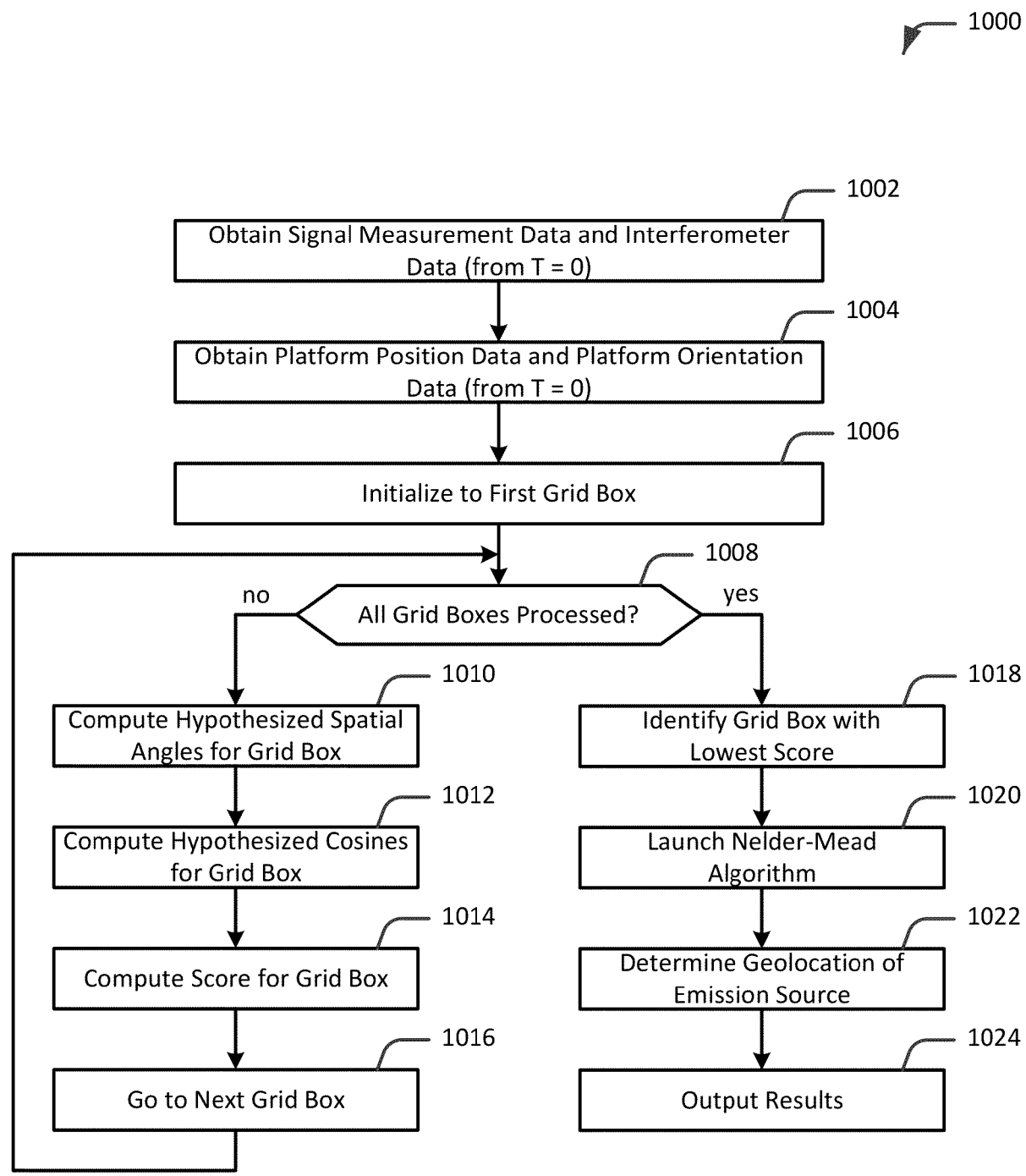
FIG. 10 is a flow diagram illustrating an example geolocation computation process performed during the overall process of FIG. 8, in accordance with an embodiment of the present disclosure.

Otherwise, if the geolocation computation time has not been exceeded, then, at 810, geolocation processing component 516 checks to determine if it is time to perform a geolocation computation. The geolocation computation processing interval specifies the discrete times during the geolocation computation time period at which to perform the geolocation computation. If it is not time to perform a geolocation computation, then, at 812, geolocation processing component 516 waits until it is time to perform a geolocation computation. If it is time to perform a geolocation computation, then, at 814, geolocation processing component 516 performs the geolocation computation. FIG. 10 provides further details of performing the geolocation computation at 814, according to some embodiments.

FIG. 10 is a flow diagram illustrating an example geolocation computation process 1000 performed during the overall process 800 of FIG. 8, in accordance with an embodiment of the present disclosure. At 1002, geolocation processing component 516 obtains the signal measurement data and the interferometer data collected since the start of the geolocation processing time period (e.g., from time T=0). This is the data collected over all of the past data collection intervals. The signal measurement data and the interferometer data may be collected by interferometer component 504. The signal measurement data can include the measured phase differences, the measured spatial angles, and the TOAs of all the pulses received since the start of the geolocation processing time period. The interferometer data can include the position and orientation of the SBI that measured the phase differences at the TOAs of all the pulses received since the start of the geolocation processing time period.

At 1004, geolocation processing component 516 obtains the platform position and orientation data collected since the start of the geolocation processing time period (e.g., from time T=0). The platform position and orientation data may be collected by navigation system 510. The platform position data can include the latitude, longitude, and altitude coordinates of aircraft 102 computed by navigation system 510 since the start of the geolocation processing time period. The platform orientation data can include the roll, pitch, and yaw of aircraft 102 computed by navigation system 510 since the start of the geolocation processing time period.

At 1006, geolocation processing component 516 identifies a first grid box in the grid and initializes to the first grid box. The first grid can be any of the grid boxes in the array. Here, geolocation processing component 516 is identifying a grid box in order to determine a score for the grid box. At 1008, geolocation processing component 516 checks to determine whether all the grid boxes in the grid have been processed. This check is to determine whether scores have been assigned to all the grid boxes. If there is a grid box to process, such as the first grid box, for instance, then, at 1010, geolocation processing component 516 computes the hypothesized spatial angles for the grid box. A hypothesized spatial angle is computed for each of the times when a measured spatial angle was computed (e.g., for each TOA of the received pulse). To provide an illustrative example, assuming 50 measured spatial angles, geolocation processing component 516 computes 50 hypothesized spatial angles for the grid box, where each hypothesized spatial angle corresponds to a time when a particular one of the 50 measured spatial angles was computed. As described previously, a hypothesized spatial angle for a measured spatial angle is a spatial angle that would have been measured by interferometer component 514 at the time of measuring the phase angle used to compute the measured spatial angle had the emission source been actually located at a point in the grid box. This point in the grid box can be any point (e.g., location) in the grid box and, in some embodiments, is a point in the center or substantially in the center of the grid box.

At 1012, geolocation processing component 516 computes the hypothesized cosines for the grid box. Here, a hypothesized cosine is computed for each hypothesized spatial angle. At 1014, geolocation processing component 516 computes a score for the grid box. The score may be based on the hypothesized spatial angles computed for the grid box and the measured spatial angles. The score may indicate the closeness of the hypothesized spatial angles and the measured spatial angles. In an embodiment, the score can be based on the hypothesized cosines computed for the grid box and the measured cosines. At 1016, geolocation processing component 516 proceeds to the next or another grid box in the grid and, at 1008, checks to determine whether all the grid boxes in the grid have been processed.

If all the grid boxes in the grid have been processed (e.g., scores have been assigned to all the grid boxes), then, at 1018, geolocation processing component 516 identifies the grid box with the lowest score. For instance, the grid box with the lowest score may be the grid box whose computed hypothesized spatial angles are closest to the measured spatial angles. At 1020, geolocation processing component 516 launches geolocation optimization component 518 using the identified grid box as a seed or initial location. At 1022, geolocation processing component 516 determines the geolocation of the emission source from the results provided by geolocation optimization component 516. Geolocation processing component 516 can compute the true bearing angle from aircraft 102 to the geographic location of the emission source from the final position of aircraft 102 at the end of the data collection interval. At 1024, geolocation processing component 516 outputs the results of the geolocation computation.

Referring again to process 800 of FIG. 8, at 816, geolocation processing component 516 increments the geolocation computation time. To provide an illustrative example, suppose the geolocation computation time interval is set to T=5 seconds, and the just-completed geolocation computation was started at T=10 seconds. In this example, geolocation processing component 516 increments the geolocation computation time to T=15 seconds. Process 800 proceeds from 816 to 806 where geolocation processing component 516 checks to determine whether the geolocation computation time is exceeded.

Further Example Embodiments

The following examples pertain to further embodiments, from which numerous permutations and configurations will be apparent.

Example 1 is a computer program product including one or more non-transitory machine-readable mediums encoding instructions that when executed by one or more processors cause a process to be carried out for determining a true bearing angle from a spatial angle, the process including: receiving a plurality of pulses of an electromagnetic signal emitted by an emission source, the plurality of pulses comprising a first pulse and a second pulse; computing a first measured spatial angle computed for the first pulse; computing a second measured spatial angle computed for the second pulse; generating a grid based on an angle-of-arrival of, and range to, the electromagnetic signal, the grid comprising a plurality of grid boxes; computing first and second hypothesized spatial angles for each of first and second grid boxes; computing a score for each of the first and second grid boxes, wherein the score for the first grid box is based on the first and second hypothesized spatial angles computed for the first grid box and the first and second measured spatial angles, and wherein the score for the second grid box is based on the first and second hypothesized spatial angles computed for the second grid box and the first and second measured spatial angles; identifying a grid box of the plurality of grid boxes as a seed location; launching a Nelder-Mead algorithm using the seed location; and determining a geographic location of the emission source based on results from the Nelder-Mead algorithm, wherein determining the geographic location comprises computing a true bearing angle to the emission source.

Example 2 includes the subject matter of Example 1, wherein the first and second hypothesized spatial angles are computed for an identified point in each of the first and second grid boxes.

Example 3 includes the subject matter of Example 2, wherein the identified point in each of the first and second grid boxes is a point at a center of each of the first and second grid boxes.

Example 4 includes the subject matter of any of Examples 1 through 3, wherein the identified point in each of the first and second grid boxes being a candidate location of the emission source in each of the first and second grid boxes.

Example 5 includes the subject matter of any of Examples 1 through 4, wherein the score for each of the first and second grid boxes is a measure of closeness of the first and second hypothesized spatial angles computed for each of the first and second grid boxes and the first and second measured spatial angles.

Example 6 includes the subject matter of any of Examples 1 through 5, wherein the score for a grid box is the sum of the squares of the differences between the first and second measured spatial angles and the first and second hypothesized spatial angles computed for the grid box.

Example 7 includes the subject matter of any of Examples 1 through 5, wherein the score for a grid box is the sum of the absolute values of the differences between the first and second measured spatial angles and the first and second hypothesized spatial angles computed for the grid box.

Example 8 includes the subject matter of any of Examples 1 through 7, wherein the seed location is a grid box of the plurality of grid boxes having a lowest score.

Example 9 includes the subject matter of any of Examples 1 through 8, wherein the grid is a 2-dimensional grid projected on the Earth surface.

Example 10 includes the subject matter of any of Examples 1 through 9, wherein the grid is a sparse grid such that spacing between the plurality of grid boxes is about 2 nautical miles (nm).

Example 11 includes the subject matter of any of Examples 1 through 10, wherein the grid is at least one of at least a quadrant in azimuth, at least 2 nm in range, at most 200 nm in range, or have a spacing of 1 degree.

Example 12 includes the subject matter of any of Examples 1 through 11, wherein the grid serves to constrain the geographic location of the emission source.

Example 13 includes the subject matter of any of Examples 1 through 12, wherein the electromagnetic signal is a radar signal.

Example 14 includes the subject matter of any of Examples 1 through 13, wherein the first and second pulses are received by an interferometer.

Example 15 includes the subject matter of Examples 14, wherein the interferometer is a short baseline interferometer.

Example 16 includes the subject matter of any of Examples 1 through 15, wherein the first hypothesized spatial angle for each of the first and second grid boxes is computed for a time-of-arrival (TOA) of the first pulse, and wherein the second hypothesized spatial angle for each of the first and second grid boxes is computed for a TOA of the second pulse.

Example 17 is a computer program product including one or more non-transitory machine-readable mediums encoding instructions that when executed by one or more processors cause a process to be carried out for determining a true bearing angle from a spatial angle, the process including: receiving a plurality of pulses of an electromagnetic signal emitted by an emission source, the plurality of pulses comprising a first pulse and a second pulse; computing a cosine of a first measured spatial angle computed for the first pulse; computing a cosine of a second measured spatial angle computed for the second pulse; generating a grid based on an angle-of-arrival of, and range to, the electromagnetic signal, the grid comprising a plurality of grid boxes; identifying a point in each of first and second grid boxes; computing cosines of first and second hypothesized spatial angles computed for the identified point in each of the first and second grid boxes; computing a score for each of the first and second grid boxes, wherein the score for the first grid box is based on the cosines of the first and second hypothesized spatial angles computed for the first grid box and the cosines of the first and second measured spatial angles, and wherein the score for the second grid box is based on the cosines of the first and second hypothesized spatial angles computed for the second grid box and the cosines of the first and second measured spatial angles; identifying a grid box of the plurality of grid boxes having a lowest score as a seed location; launching a Nelder-Mead algorithm using the seed location; and computing a true bearing angle to the emission source based on results from the Nelder-Mead algorithm.

Example 18 includes the subject matter of Example 17, wherein the identified point in each of the first and second grid boxes is a point at a center of each of the first and second grid boxes.

Example 19 includes the subject matter of any of Examples 17 and 18, wherein the identified point in each of the first and second grid boxes being a candidate location of the emission source in each of the first and second grid boxes.

Example 20 includes the subject matter of any of Examples 17 through 19, wherein the cosine of the first hypothesized spatial angle for each of the first and second grid boxes is computed for a time-of-arrival (TOA) of the first pulse, and wherein the cosine of the second hypothesized spatial angle for each of the first and second grid boxes is computed for a TOA of the second pulse.

Example 21 includes the subject matter of any of Examples 17 through 20, wherein the score for each of the first and second grid boxes is a measure of closeness of the cosines of the first and second hypothesized spatial angles computed for each of the first and second grid boxes and the cosines of the first and second measured spatial angles.

Example 22 includes the subject matter of any of Examples 17 through 21, wherein the score for a grid box is the sum of the squares of the differences between the cosines of the first and second measured spatial angles and the cosines of the first and second hypothesized spatial angles computed for the grid box.

Example 23 includes the subject matter of any of Examples 17 through 21, wherein the score for a grid box is the sum of the absolute values of the differences between the cosines of the first and second measured spatial angles and the cosines of the first and second hypothesized spatial angles computed for the grid box.

Example 24 includes the subject matter of any of Examples 17 through 23, wherein the seed location is a grid box of the plurality of grid boxes having a lowest score.

Example 25 includes the subject matter of any of Examples 17 through 24, wherein the grid is a 2-dimensional grid projected on the Earth surface.

Example 26 includes the subject matter of any of Examples 17 through 25, wherein the grid is a sparse grid such that spacing between the plurality of grid boxes is about 2 nautical miles (nm).

Example 27 includes the subject matter of any of Examples 17 through 26, wherein the grid is at least one of at least a quadrant in azimuth, at least 2 nm in range, at most 200 nm in range, or have a spacing of 1 degree.

Example 28 includes the subject matter of any of Examples 17 through 27, wherein the grid serves to constrain the geographic location of the emission source.

Example 29 includes the subject matter of any of Examples 17 through 28, wherein the electromagnetic signal is a radar signal.

Example 30 includes the subject matter of any of Examples 17 through 29, wherein the first and second pulses are received by an interferometer.

Example 31 includes the subject matter of Examples 30, wherein the interferometer is a short baseline interferometer.

Example 32 is a system to determine a true bearing angle from a spatial angle. The system includes one or more non-transitory machine-readable mediums configured to store instructions, and one or more processors configured to execute the instructions stored on the one or more non-transitory machine-readable mediums. Execution of the instructions causes the one or more processors to: compute a cosine of a first measured spatial angle computed for a first pulse of a radar signal; compute a cosine of a second measured spatial angle computed for a second pulse of the radar signal; generate a grid based on an angle-of-arrival of the radar signal, the grid comprising a plurality of grid boxes; identify a point in each of first and second grid boxes, wherein the point is a candidate location of an emission source in each of the first and second grid boxes; compute cosines of first and second hypothesized spatial angles computed for the identified point in each of the first and second grid boxes; compute a score for each of the first and second grid boxes, wherein the score for the first grid box is based on the cosines of the first and second hypothesized spatial angles computed for the first grid box and the cosines of the first and second measured spatial angles, and wherein the score for the second grid box is based on the cosines of the first and second hypothesized spatial angles computed for the second grid box and the cosines of the first and second measured spatial angles; identify a grid box of the plurality of grid boxes having a lowest score as a seed location; launch a Nelder-Mead algorithm using the seed location; and compute a true bearing angle to a source of the radar signal based on results from the Nelder-Mead algorithm.

Example 33 includes the subject matter of Example 32, wherein the identified point in each of the first and second grid boxes is a point at a center of each of the first and second grid boxes.

Example 34 includes the subject matter of any of Examples 32 and 33, wherein the cosine of the first hypothesized spatial angle for each of the first and second grid boxes is computed for a time-of-arrival (TOA) of the first pulse, and wherein the cosine of the second hypothesized spatial angle for each of the first and second grid boxes is computed for a TOA of the second pulse.

Example 35 includes the subject matter of any of Examples 32 through 34, wherein the score for each of the first and second grid boxes is a measure of closeness of the cosines of the first and second hypothesized spatial angles computed for each of the first and second grid boxes and the cosines of the first and second measured spatial angles.

Example 36 includes the subject matter of any of Examples 32 through 35, wherein the score for a grid box is the sum of the squares of the differences between the cosines of the first and second measured spatial angles and the cosines of the first and second hypothesized spatial angles computed for the grid box.

Example 37 includes the subject matter of any of Examples 32 through 35, wherein the score for a grid box is the sum of the absolute values of the differences between the cosines of the first and second measured spatial angles and the cosines of the first and second hypothesized spatial angles computed for the grid box.

Example 38 includes the subject matter of any of Examples 32 through 37, wherein the grid is a 2-dimensional grid projected on the Earth surface.

Example 39 includes the subject matter of any of Examples 32 through 38, wherein the grid is a sparse grid such that spacing between the plurality of grid boxes is about 2 nautical miles (nm).

Example 40 includes the subject matter of any of Examples 32 through 39, wherein the grid is at least one of at least a quadrant in azimuth, at least 2 nm in range, at most 200 nm in range, or have a spacing of 1 degree.

Example 41 includes the subject matter of any of Examples 32 through 40, wherein the grid serves to constrain the geographic location of the emission source.

Example 42 includes the subject matter of any of Examples 32 through 41, wherein the first and second pulses are received by an interferometer.

Example 43 includes the subject matter of Examples 42, wherein the interferometer is a short baseline interferometer.

Example 44 is an aerial platform that includes the subject matter of any of Examples 32 through 43.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer program product including one or more non-transitory machine-readable mediums encoding instructions that when executed by one or more processors cause a process to be carried out for determining a true bearing angle from a spatial angle, the process comprising:
   receiving a plurality of pulses of an electromagnetic signal emitted by an emission source, the plurality of pulses comprising a first pulse and a second pulse;
   computing a first measured spatial angle computed for the first pulse;
   computing a second measured spatial angle computed for the second pulse;
   computing an angle-of-arrival of the electromagnetic signal and a range to the electromagnetic signal;
   generating a grid based on the angle-of-arrival of, and the range to, the electromagnetic signal, the grid comprising a plurality of grid boxes;
   computing first and second hypothesized spatial angles for each of first and second grid boxes;
   computing a score for each of the first and second grid boxes, wherein the score for the first grid box is based on the first and second hypothesized spatial angles computed for the first grid box and the first and second measured spatial angles, and wherein the score for the second grid box is based on the first and second hypothesized spatial angles computed for the second grid box and the first and second measured spatial angles;
   identifying a grid box of the plurality of grid boxes as a seed location;
   launching a Nelder-Mead algorithm using the seed location; and
   determining a geographic location of the emission source based on results from the Nelder-Mead algorithm, wherein determining the geographic location comprises computing a true bearing angle to the emission source.

2. The computer program product of claim 1, wherein the first and second hypothesized spatial angles are computed for an identified point in each of the first and second grid boxes.

3. The computer program product of claim 2, wherein the identified point in each of the first and second grid boxes being a candidate location of the emission source in each of the first and second grid boxes.

4. The computer program product of claim 1, wherein the score for each of the first and second grid boxes is a measure of closeness of the first and second hypothesized spatial angles computed for each of the first and second grid boxes and the first and second measured spatial angles.

5. The computer program product of claim 1, wherein the score for a grid box is the sum of the squares of the differences between the first and second measured spatial angles and the first and second hypothesized spatial angles computed for the grid box.

6. The computer program product of claim 1, wherein the score for a grid box is the sum of the absolute values of the differences between the first and second measured spatial angles and the first and second hypothesized spatial angles computed for the grid box.

7. The computer program product of claim 1, wherein the seed location is a grid box of the plurality of grid boxes having a lowest score.

8. The computer program product of claim 1, wherein the grid is a 2-dimensional grid projected on the Earth surface.

9. The computer program product of claim 1, wherein the grid is a sparse grid such that spacing between the plurality of grid boxes is about 2 nautical miles (nm).

10. The computer program product of claim 1, wherein the grid is at least one of at least a quadrant in azimuth, at least 2 nm in range, at most 200 nm in range, or have a spacing of 1 degree.

11. The computer program product of claim 1, wherein the grid serves to constrain the geographic location of the emission source.

12. The computer program product of claim 1, wherein the electromagnetic signal is a radar signal.

13. A computer program product including one or more non-transitory machine-readable mediums encoding instructions that when executed by one or more processors cause a process to be carried out for determining a true bearing angle from a spatial angle, the process comprising:
   receiving a plurality of pulses of an electromagnetic signal emitted by an emission source, the plurality of pulses comprising a first pulse and a second pulse;
   computing a cosine of a first measured spatial angle computed for the first pulse;
   computing a cosine of a second measured spatial angle computed for the second pulse;
   computing an angle-of-arrival of the electromagnetic signal and a range to the electromagnetic signal;
   generating a grid based on the angle-of-arrival of, and the range to, the electromagnetic signal, the grid comprising a plurality of grid boxes;
   identifying a point in each of first and second grid boxes;
   computing cosines of first and second hypothesized spatial angles computed for the identified point in each of the first and second grid boxes;
   computing a score for each of the first and second grid boxes, wherein the score for the first grid box is based on the cosines of the first and second hypothesized spatial angles computed for the first grid box and the cosines of the first and second measured spatial angles, and wherein the score for the second grid box is based on the cosines of the first and second hypothesized spatial angles computed for the second grid box and the cosines of the first and second measured spatial angles;
   identifying a grid box of the plurality of grid boxes having a lowest score as a seed location;
   launching a Nelder-Mead algorithm using the seed location; and
   computing a true bearing angle to the emission source based on results from the Nelder-Mead algorithm.

14. The computer program product of claim 13, wherein the first and second pulses are received by an interferometer.

15. The computer program product of claim 14, wherein the interferometer is a short baseline interferometer.

16. The computer program product of claim 13, wherein the cosine of the first hypothesized spatial angle for each of the first and second grid boxes is computed for a time-of-arrival (TOA) of the first pulse, and wherein the cosine of the second hypothesized spatial angle for each of the first and second grid boxes is computed for a TOA of the second pulse.

17. The computer program product of claim 13, wherein the score for each of the first and second grid boxes is a measure of closeness of the cosines of the first and second hypothesized spatial angles computed for each of the first and second grid boxes and the cosines of the first and second measured spatial angles.

18. The computer program product of claim 13, wherein the identified point in each of the first and second grid boxes is a point at a center of each of the first and second grid boxes.

19. A system to determine a true bearing angle from a spatial angle, the system comprising:
   one or more non-transitory machine-readable mediums configured to store instructions; and
   one or more processors configured to execute the instructions stored on the one or more non-transitory machine-readable mediums, wherein execution of the instructions causes the one or more processors to
   compute a cosine of a first measured spatial angle computed for a first pulse of a radar signal;
   compute a cosine of a second measured spatial angle computed for a second pulse of the radar signal;
   compute an angle-of-arrival of the electromagnetic signal;
   generate a grid based on the angle-of-arrival of the radar signal, the grid comprising a plurality of grid boxes;
   identify a point in each of first and second grid boxes, wherein the point is a candidate location of an emission source in each of the first and second grid boxes;
   compute cosines of first and second hypothesized spatial angles computed for the identified point in each of the first and second grid boxes;
   compute a score for each of the first and second grid boxes, wherein the score for the first grid box is based on the cosines of the first and second hypothesized spatial angles computed for the first grid box and the cosines of the first and second measured spatial angles, and wherein the score for the second grid box is based on the cosines of the first and second hypothesized spatial angles computed for the second grid box and the cosines of the first and second measured spatial angles;
   identify a grid box of the plurality of grid boxes having a lowest score as a seed location;
   launch a Nelder-Mead algorithm using the seed location; and
   compute a true bearing angle to a source of the radar signal based on results from the Nelder-Mead algorithm.

20. An aerial platform comprising the system of claim 19.

* * * * *